No. 810,803. PATENTED JAN. 23, 1906.
C. E. PARSONS.
CUSHION DEVICE FOR GATES OF WATER WHEEL CASINGS.
APPLICATION FILED APR. 1, 1905.

4 SHEETS—SHEET 1.

Witnesses:
Inventor
C. E. Parsons

No. 810,803. PATENTED JAN. 23, 1906.
C. E. PARSONS.
CUSHION DEVICE FOR GATES OF WATER WHEEL CASINGS.
APPLICATION FILED APR. 1, 1905.

4 SHEETS—SHEET 3.

Witnesses: Inventor:
C. E. Parsons.

No. 810,803. PATENTED JAN. 23, 1906.
C. E. PARSONS.
CUSHION DEVICE FOR GATES OF WATER WHEEL CASINGS.
APPLICATION FILED APR. 1, 1905
4 SHEETS—SHEET 4.
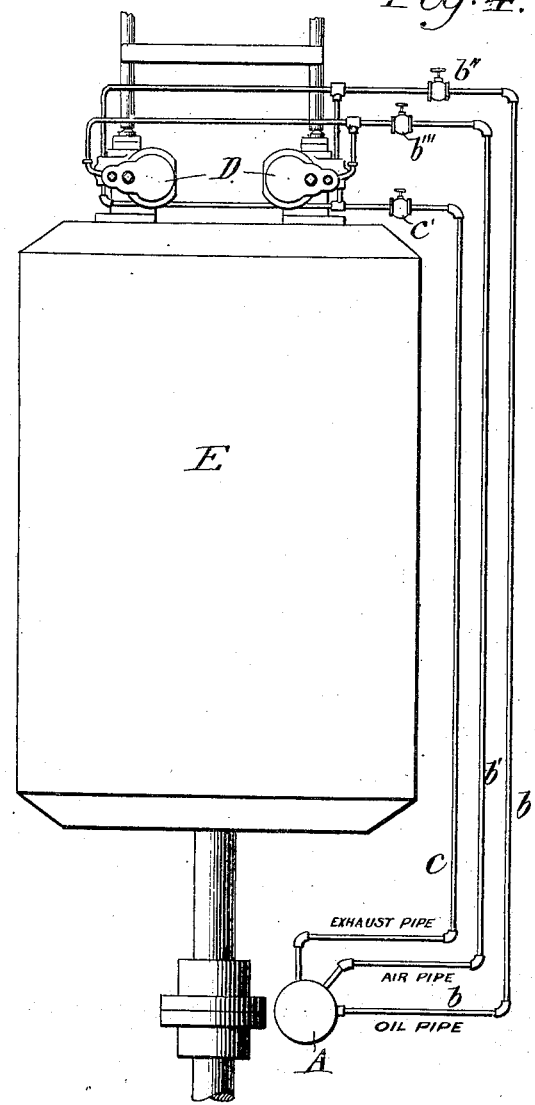
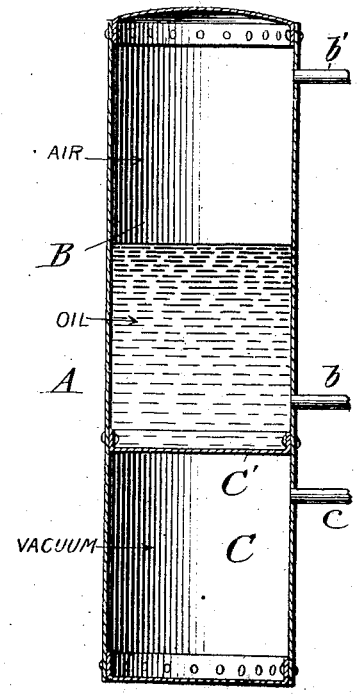

UNITED STATES PATENT OFFICE.

CHARLES E. PARSONS, OF GLENS FALLS, NEW YORK.

CUSHION DEVICE FOR GATES OF WATER-WHEEL CASINGS.

No. 810,802.

Specification of Letters Patent.

Patented Jan. 23, 1906.

Application filed April 1, 1905. Serial No. 253,339.

*To all whom it may concern:*

Be it known that I, CHARLES E. PARSONS, a citizen of the United States, residing at Glens Falls, county of Warren, State of New York, have invented certain new and useful Improvements in Cushion Devices for Gates of Water-Wheel Casings and the Like; and I do hereby declare the following to be a full, clear, and exact description of the invention, such as will enable others skilled in the art to which it appertains to make and use the same.

This invention relates to devices for avoiding the sudden and dangerous increase of pressure in closed conduits and vessels due to the abrupt stoppage of the flow of fluid therein or to similar causes.

My invention is available for use in various relations involving a closed vessel or conduit wherein there is liability of sudden and dangerous increase of pressure owing to the rapid closing of the valve or gate controlling the inlet or exit thereof. It is, however, specially applicable to the conditions existing in hydraulic systems wherein the penstocks and water-wheel casings are liable to be subjected to such rapid increase of pressure by the sudden arrest of the moving column of water when the gates are moved by the usual governor or other appropriate means to shut off the water from the wheel as to cause them to burst, thus entailing great damage and loss to the plant and to adjacent properties and is illustrated and will be described in this connection.

One object of my invention is to oppose to and operate by a moving part—for example, a water-wheel gate—a confined body of compressible fluid, as air or gas, constituting a yielding gradually-increasing resistance the pressure of which may be gaged with relation to the weight or power of the gate to finally stop its movement at a determined point.

A further object of the invention is to provide a gradually-increasing yielding resistance opposed to and operated by a moving part and means to relieve the moving part from the pressure of the resistance.

With these and other objects in view my invention will be described in detail in the ensuing specification and set forth in the claims.

Figure 1:
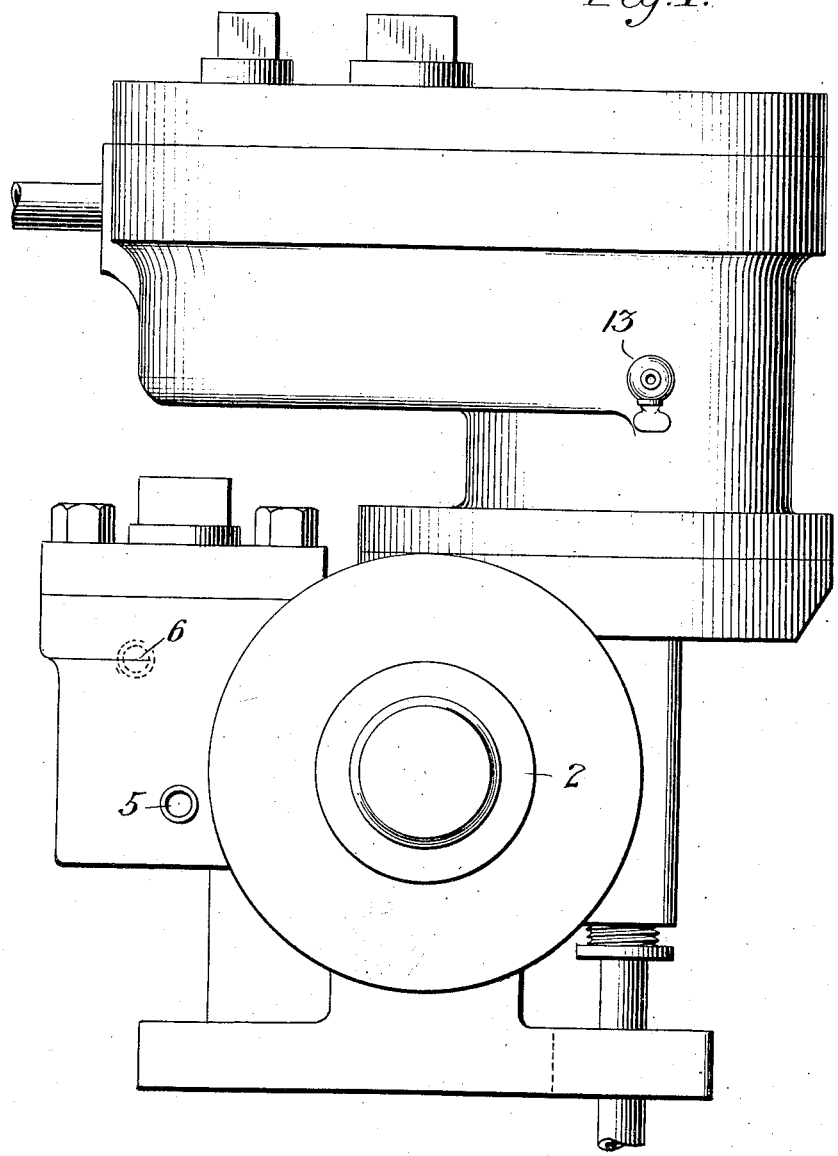
Figure 2:
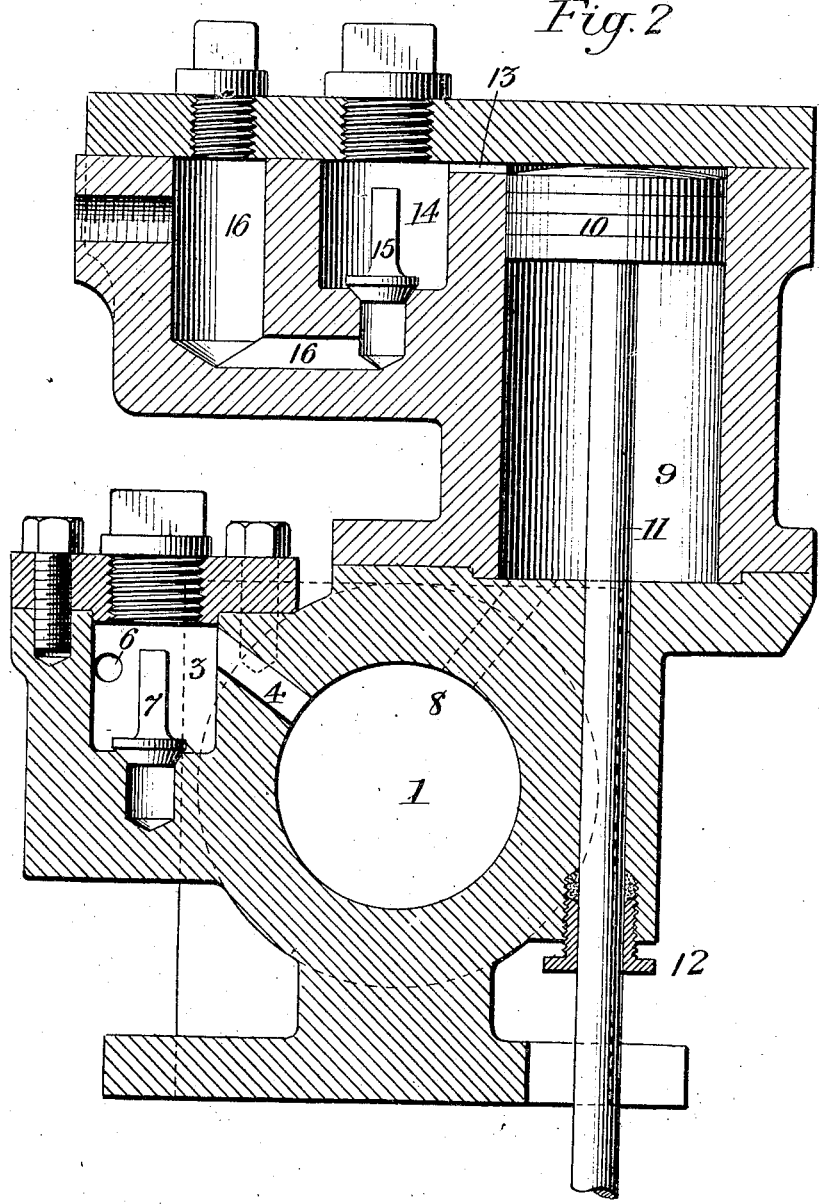
Figure 3:
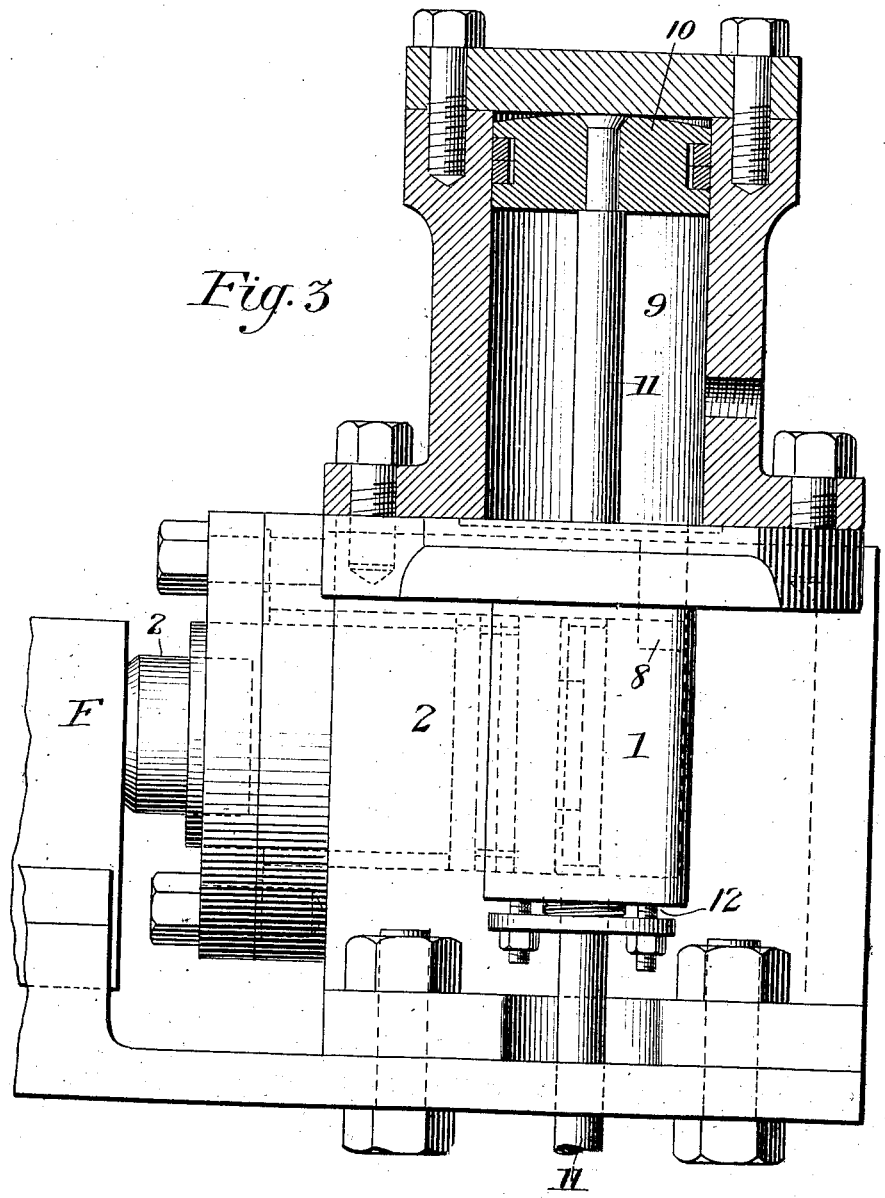

In the accompanying drawings, illustrating one form of device for carrying my invention into practice, Figure 1 is an elevation of the case or housing of a cushioning device embodying my invention. Fig. 2 is a vertical section thereof. Fig. 3 is a similar section taken in a plane at right angles with that of Fig. 2. Fig. 4 is a diagrammatic view showing the relation of my cushions to pressure and vacuum tanks and to the gate-rods and water-wheel case of a hydraulic plant. Fig. 5 is a sectional detail of one form of pressure and vacuum tank.

My invention involves two communicating pressure-chambers, here shown as a tank A, having a single pressure-chamber B, containing air and a non-compressible fluid, such as oil or glycerin, under pressure—say two hundred pounds—an exhaust or vacuum tank, which may be, as here shown, a chamber C, contained in the walls of the tank A and separated from the pressure or oil and air chamber B by a stout impervious partition C', and the cushioning device D, which is connected by suitable ports and piping (to be hereinafter designated by reference characters) with the air and oil or pressure chamber B of the tank A and also with the vacuum-chamber C thereof. These elements are conveniently located with relation to the penstock and water-wheel casing E of a hydraulic system or plant and with the valve or gate which controls the flow of water from the penstock, said gate being operated by a governor-controlled engine or other means commonly employed and constituting the usual and well-known accompaniments of such plants, and therefore needing no detailed description herein.

At a convenient point adjacent to or more or less remote from the gate which controls the waterflow from the penstock to the wheel-casing E is my cushioning device D, operated from or by the gate in its closing movement by means of the gate-rods F or projections attached to or forming part of the gate, said rods F and the cushion D being so arranged that the former in the closing movement of the gate will impinge upon a piston or its stem protruding from the cushion-casing and thrust it inward within said casing.

My cushioning device D comprises a stout casing or housing provided with a cylinder 1, hereinafter called the "oil-cylinder," within which is mounted to reciprocate a piston 2, suitably packed to prevent the escape of oil between it and the cylinder. (See Fig. 3.) A valve-chamber 3, located in the housing, communicates through passage or port 4 with the extreme inner end of the oil-cylinder 1, said chamber 3 being provided also with a passage 5 to receive the end of a pipe $b$, leading from the oil-tank B. The upper part of the valve-chamber is also provided with a tapped passage or opening 6 to receive the end of the pipe $c$ leading to the vacuum-chamber C. Seated in the valve-chamber to control the passage 5 is a check-valve 7, and in the pipes $b$ and $c$, connecting said valve-chamber and the pressure and vacuum tank are automatic or manually actuated valves $b''$ $c'$, respectively, preferably the latter, to control communication between pressure-tank B and the valve-chamber 3 and between vacuum-tank C and said valve-chamber. Communicating by a passage 8 with the inner end of the cylinder 1 is what I shall for convenience term an "air-cylinder" 9, which is provided with a piston 10, suitably packed, having a stem 11, which protrudes through a gland or stuffing-box 12 in base of said cylinder 9 and constituting an indicator or telltale, its position always denoting the position of the piston 10 within its cylinder. The upper end of the air-cylinder 9 communicates through a port or passage 13 with an air-valve chamber 14, containing a check-valve 15, which controls a passage 16, into which is screwed a pipe $b'$, which communicates with the air-space of the pressure-tank B. In order that the air-valve 15 may be tight when resting on its seat, I prefer to fill the valve-chamber 14 with glycerin nearly to the height of the passage 13. It will be seen from this construction that under normal conditions the piston 2 of the oil-chamber 1 and the piston 10 of the air-chamber 8, though otherwise balanced by the pressure in tank B, will be out of balance and piston 10 will be at the inner or lower end of its chamber, owing to difference in surface area on opposite sides of the air-piston 10, the lower surface thereof being reduced in area by the stem 10, so that each piston will be at the outer end of its stroke and the cylinder 1 and cylinder 9 will contain, respectively, oil and air under the same determined pressure. If now under these conditions the gate is started by the usual governor-controlled engine or other means in its closing movement, the gate rod or projection F, contacting with the outer end of the piston 2, will move the piston inward, thus forcing the oil in cylinder 1 through passage 8 beneath the piston 10, passage of oil to pressure-tank B being prevented by check-valve 7, thus, in effect, constituting a liquid-piston which enters cylinder 9 and forces the piston 10 upward and further compresses the air in cylinder 9 within the upper end thereof and in the air-valve chamber 14 until the power represented by the compressed air exceeds that of the closing gate, when the latter will be brought to rest, and the parts are so proportioned that the gate will be stopped before entirely closing communication between the penstock and water-wheel, so that the movement of the column of water through the penstock will not at this time be entirely stopped, thus insuring the system against the shock of sudden stoppage of the flow of the column of water. Moreover, it will be seen that as the gate advances in its closing movement the increasing compression of air in cylinder 9 will serve to more and more retard the movement of the gate, thus gradually bringing the moving column of water to rest, or nearly so, before or at the time of the final closing of the gate. If now it is desired to completely close the gate, the valve $b''$ between the oil-pressure tank B and oil-valve chamber 3 is closed, thus shutting off the pressure from said tank, and the valve $c'$ between said chamber and the vacuum-tank C is opened, thus drawing the oil or other non-compressible liquid-piston from the cylinders 9 and 1, so that the further closing movement of the gate is opposed only by the compressed air behind the piston 10, the latter as the pressure from tank B is removed resuming its position at the inner end of its cylinder 9 under usual conditions. Upon raising the gate and freeing the end of piston 2 from contact with the rods or projections F of the gate and turning the valves $b''$ and $c'$, controlling pipes $b$ and $c$, to appropriate positions oil under pressure is again admitted to the oil-cylinder 1, forcing the piston 2 to its original or outermost position and again balancing the pressure in the cylinders 1 and 9.

The air-cylinder 9 is provided near its lower end with a blow-off cock 13 to discharge any oil that may accumulate in the air-chamber in front of the piston 10.

It will be understood that the vacuum in the lower section C of tank A may be maintained by the oil-pump which forms a part of the usual governor mechanism. It will also be understood that the air and oil pressure chambers may be separate and more or less remote, but that the same pressure should be maintained in both, and so if separate they may be connected by an air-pipe. It is also to be noted in connection with the foregoing description of one form of the invention and the mode of applying and operating the same that while the necessary pressure of the oil and air in the system and the required degree of vacuum in the compartment C may be, and preferably is, maintained by the usual pump and tank of the water-wheel-governing mechanism the required conditions of pressure and vacuity may be produced by a head of water, a separate pump for the liquid or the air, or for both, or by any other suitable means or apparatus.

Having thus described my invention, what I claim, and desire to secure, is—

1. An apparatus for gradually restraining a moving body, comprising a housing containing a non-compressible fluid under pressure, and an elastic-fluid cushion of high initial pressure operatively connected with said non-compressible cushion.

2. An apparatus for gradually restraining a moving body, comprising a housing, a piston in said housing adapted to be moved by the moving body, a non-compressible fluid under pressure behind said piston, and an elastic-fluid cushion of high initial pressure operatively connected with said non-compressible fluid.

3. An apparatus for gradually restraining a moving body, comprising a housing, a piston in said housing adapted to be moved by the moving body, a non-compressible fluid behind said piston, an elastic-fluid cushion operatively connected with said non-compressible fluid, and means for relieving the elastic cushion.

4. An apparatus for gradually restraining a moving body, comprising a housing having communicating cylinders, pistons in said cylinders, a non-compressible fluid behind one piston, an elastic cushion behind the other piston, and means connecting said first-mentioned piston with the moving body.

5. An apparatus for gradually restraining a moving body, comprising a housing having communicating cylinders, pistons in said cylinders, a non-compressible fluid behind one piston, an elastic cushion behind the other piston, means connecting said first-mentioned piston with the moving body, and means for relieving the elastic cushion.

6. An apparatus for gradually restraining a moving body, comprising a housing having communicating liquid and air cylinders, pistons therein under balanced pressure, and check-valves interposed between the source of pressure and said pistons.

7. An apparatus for gradually restraining a moving body, comprising a liquid-cylinder, an air-cylinder communicating therewith, pistons in the respective cylinders, a source of liquid and a source of air under pressure communicating with the respective cylinders and check-valves interposed between the pressure source and the respective cylinders.

8. An apparatus for gradually restraining a moving body, comprising a liquid-cylinder, an air-cylinder communicating therewith, pistons in the respective cylinders, a source of liquid and a source of air under pressure communicating with the respective cylinders, check-valves interposed between the pressure source and the respective cylinders, and means for relieving the pressure in the liquid-cylinder.

9. An apparatus for gradually restraining a moving body, comprising a liquid-cylinder, an air-cylinder communicating therewith, pistons in the respective cylinders, a source of liquid and a source of air under pressure communicating with the respective cylinders, check-valves interposed between the pressure source and the respective cylinders, and means for relieving the pressure from the back of the air-piston.

10. An apparatus for gradually restraining a moving body, comprising a liquid-cylinder, an air-cylinder communicating therewith, pistons in the respective cylinders, a source of liquid and a source of air under pressure communicating with the respective cylinders, check-valves interposed between the pressure source and the respective cylinders, and means for withdrawing liquid from the liquid-cylinder.

11. A cushioning device comprising a housing containing communicating liquid and air cylinders, pistons therein, and check-valves controlling the exits from said cylinders, the check-valve for the air-cylinder having a liquid seal.

12. A cushioning device comprising a housing containing communicating liquid and air cylinders, pistons therein, check-valves controlling the exits from said cylinders, and a stem on the piston of the air-cylinder projecting from the housing and indicating the position of said piston.

In testimony whereof I affix my signature in presence of two witnesses.

CHARLES E. PARSONS.

Witnesses:
 THEO. F. KALBFLUSH,
 M. M. FRASER.